Nov. 11, 1969  D. D. LOVITZ  3,477,679
HANGER DEVICE FOR SUPPORTING AN ARTICLE ON A WALL MEMBER
Filed Feb. 2, 1968  2 Sheets-Sheet 1

INVENTOR
DAVID D. LOVITZ
BY
ATTORNEY

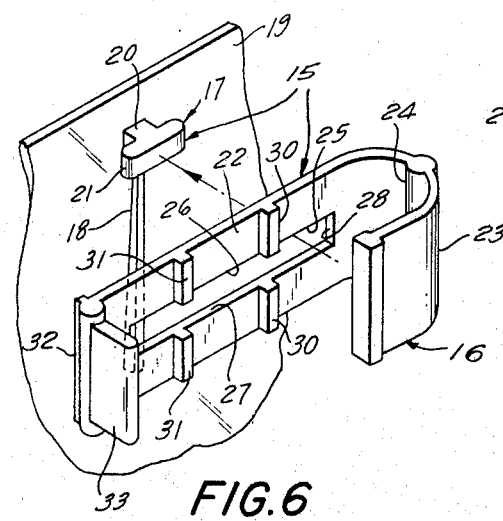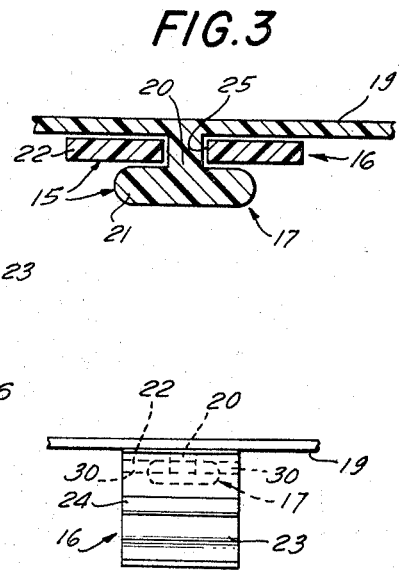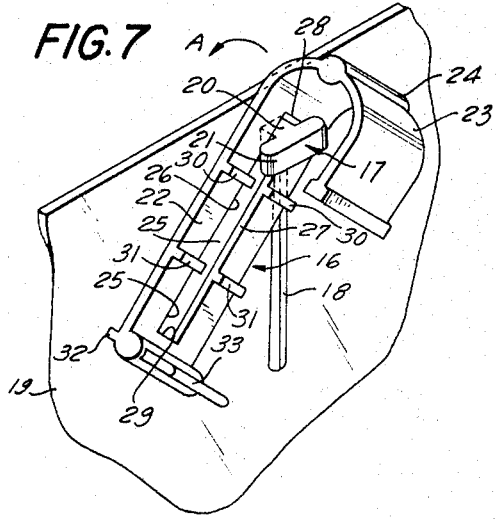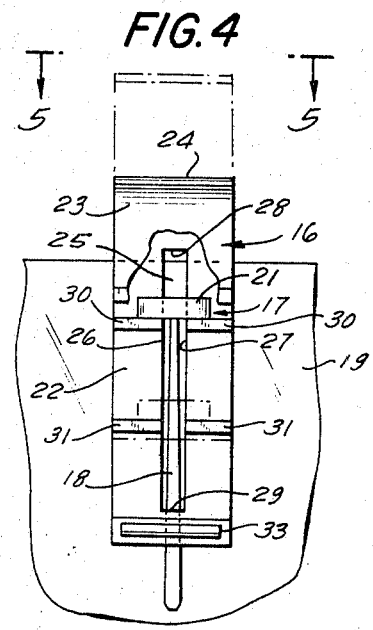

United States Patent Office 3,477,679
Patented Nov. 11, 1969

3,477,679
HANGER DEVICE FOR SUPPORTING AN ARTICLE ON A WALL MEMBER
David D. Lovitz, Short Hills, N.J., assignor to Sternco Industries, Inc., Harrison, N.J., a corporation of New Jersey
Filed Feb. 2, 1968, Ser. No. 702,593
Int. Cl. A47g 29/00
U.S. Cl. 248—309                                    5 Claims

ABSTRACT OF THE DISCLOSURE

A hanger device for adjustably supporting an article on a wall, such as a fish breeder tank within an aquarium. The device comprises a T-shaped bracket and a hook member, the bracket extending from the supported article, and hook member being adapted to be hooked on to the upper rim of the supporting wall. The hook member has a longitudinal slot through which the stem of the T-shaped bracket extends and a plurality of spaced ridges along said slot for underlying supporting engagement with the cross-bar of the T-shaped bracket, whereby the supported article may be positioned at a selected level. The hook member has opposite abutments at the bottom thereof for engaging the supported article and the supporting wall, thereby keeping the article and wall out of contact.

BACKGROUND OF THE INVENTION

Field of the invention

This invention relates to hanger devices for supporting an article on a wall, and is particularly, although not exclusively, directed to devices for removably and adjustably suspending an article within a housing, such as a fish breeder tank within an aquarium.

The known art

Known hanger devices of the above-mentioned category used with fish breeders in home aquariums commonly employ conventional hook members secured to the wall of the aquarium and arranged to support a breeder tank therein the tank generally being in engagement with a glass portion of the wall with the consequent danger of cracking the wall during the operative manipulation of the tank. Moreover such conventional hook members are frequently connected to the supported tank at weak or fragile portions thereof, and in such manner as to mutilate or seriously damage the engaged portions. And when it is required to position the supported tank at a predetermined optimum level within the aquarium, it becomes necessary to obtain hangers exactly proportioned to meet the particular requirements, the conventional devices not being suited for conveniently effecting positional adjustments.

Objectives of the invention

It is the objective of this invention to provide hanger devices adapted for suspending articles, such as breeder tanks, within a suitable housing without the above-mentioned shortcomings of conventional devices of this class. More specifically, among the objects of my invention are the provision of hanger devices that can be readily connected to the member to be supported, that will engage the supported member at a minimum number of areas and at reinforced portions thereof, that will support and maintain the supported member in spaced relation to the walls of the housing and thereby permit operative handling of said member without dangerous impacts against the housing, and that can readily be positioned in place for suspending the supported member at selected levels.

And it is a further object of this invention to provide a simple and readily fabricated device having the features above described.

Other objects, features and advantages will appear from the drawings and the description hereinafter given.

SUMMARY OF THE INVENTION

In the preferred embodiment of my invention, the article to be supported within the selected housing has a wall carrying an outwardly extending T-shaped bracket disposed in a substantially horizontal plane, there being a vertical rib on the wall extending downwardly from the bracket. A hook member is slidably mounted over the bracket, said member having a wall with a longitudinal slot therein proportioned to slidably fit over the stem of the bracket, said stem extending through the slot. Flanking said slot are a plurality of spaced pairs of ridges, each pair being proportioned and positioned for underlying engagement with the cross-bar at the end of the stem of the T-shaped bracket, whereby the bracket and the article to which it is attached may be supported by said ridges at a level corresponding to the pair of ridges selected for engagement with the bracket. The top of the hook member is of inverted U-shaped configuration, whereby it is adapted to rest upon the upper rim of the housing within which the article is contained, the bottom of said hook member having two oppositely positioned abutments, one being positioned for engagement with said rib of the supported article, and the other for engagement with the adjacent wall of the housing.

Hence no part of the supported article is in engagement with the housing, only the hook member, which is preferably made of plastic material, contacting the housing. Furthermore, said hook member is in engagement mainly with reinforced portions of the supported article, to wit, the T-shaped bracket and the said rib therebelow.

The said hook member can readily be removed from or mounted upon the bracket, or adjustably moved with respect thereto, since the thickness of the bracket is slightly less than the width of said slot—all as will more clearly hereinafter appear.

DESCRIPTION OF THE DRAWINGS

FIG. 3 is a fragmentary section of FIG. 1 taken along line 3—3.

FIG. 4 is a fragmentary rear elevational view of FIG. 2 looking in the direction of arrows 4—4, showing the hanger means of this invention without the aquarium, the dot-dash lines indicating a raised position of the hook member.

FIG. 5 is a fragmentary plan view of a portion of FIG. 1, showing one of the hook members operatively in place.

FIG. 6 is a fragmentary top perspective view of the hook member and the rear wall of the breeder tank, with the hook and bracket in disassembled relation, said hook member being shown in a position preparatory for mounting it on the bracket.

FIG. 7 is a perspective view of said hook member operatively mounted on the bracket and in an intermediate position prior to being brought to the operative position shown in FIG. 4.

DESCRIPTION OF A PREFERRED EMBODIMENT

Figure 1:
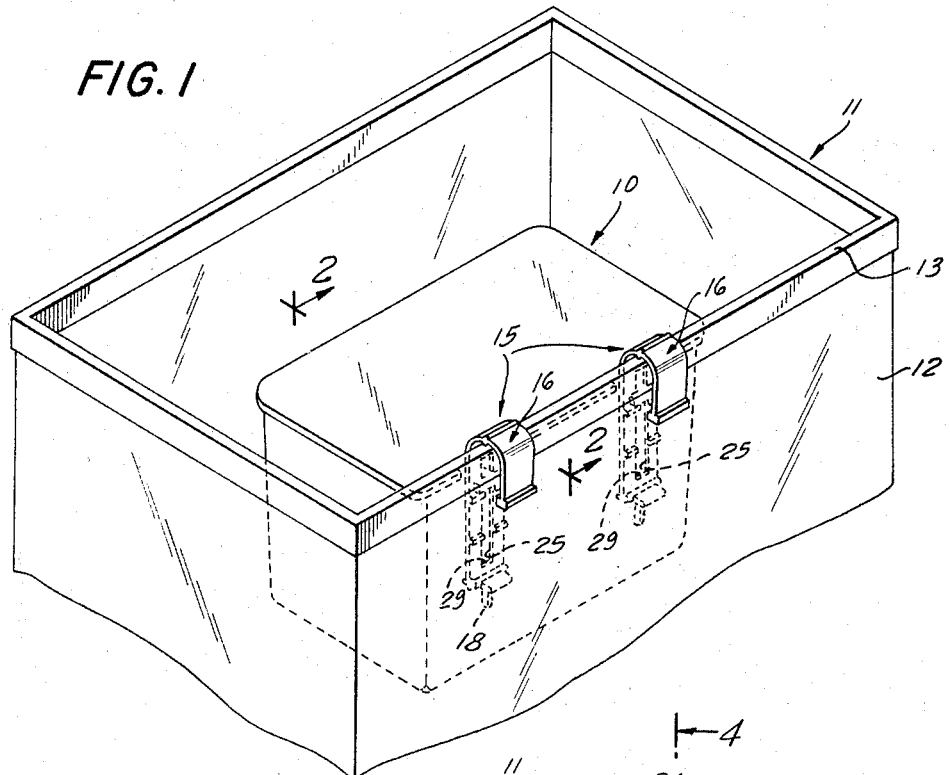
FIG. 1 is a perspective view of a breeding tank shown operatively supported within an aquarium by hanger means according to my invention.

In the particular embodiment of my invention illustrated, the supported article is a fish breeder tank generally designated 10, and the housing within which the tank is adjustably positioned is the aquarium generally designated 11, the rear wall 12 of the latter constituting the supporting wall from which the said tank is suspended by the hanger devices of this invention. The construction of said breeder tank 10 and aquarium 11 is known to those skilled in the art, and no description thereof need be given for an understanding of this invention. Suffice it to say that the upper edge of the aquarium 11 is provided with a protective rim 13 of metal or other suitable material, and that the tank 10 is provided with a removable cover 14.

The hanger devices constituting this invention—two being shown operatively supporting the tank 10 within the aquarium 11—are each generally designated by the reference numeral 15. Each hanger device 15 comprises the hook member 16, preferably made of a suitable plastic or other relatively soft material, and the T-shaped bracket 17 with the vertical rib 18 therebelow, said bracket and rib protruding rearwardly from the wall 19 of the said tank 10. Said hook member 16, bracket 17 and rib 18 are in coactive engagement when in assembled relation, the hook member being adapted for hooked suspension from said rim 13 at the upper edge of said supporting wall 12, as will more clearly appear from the description hereinafter given.

Figure 2:
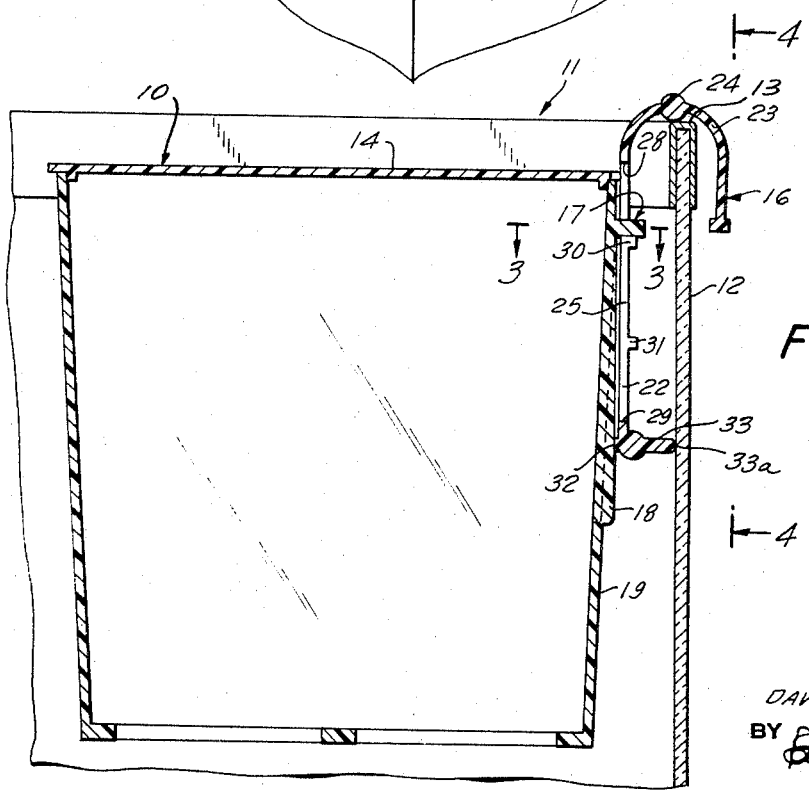
FIG. 2 is a vertical section of FIG. 1 taken substantially along line 2—2.

The said T-shaped bracket 17 is preferably integral with said wall 19, and comprises the stem 20 and cross-bar 21, said cross-bar being horizontally disposed, said stem and cross-bar being substantially in one horizontal plane. Said rib 18 extends vertically downwardly from the region of said stem, the rib, in the preferred construction, being of generally tapered configuration and of progressively increasing depth in a downwardly direction, a construction designed to give the rib progressively increasing reinforcing effectiveness in a downwardly direction, and being especially desirable where the rear wall 19 of the supported tank is inclined downwardly and forwardly, as indicated in FIG. 2.

The said hook member 16 has a substantially flat wall 22 merging at the top thereof with the inverted-U-shaped hook portion 23, the top of which has the transverse reinforcing rib 24 proportioned and positioned for resting engagement with the top of rim 13, whereby a substantial portion of the total load carried by the hook member is applied at said rib 24. Medially disposed within said wall 22 is the longitudinal slotted portion 25 defined by the lateral walls 26 and 27 and the respective top and bottom terminal walls 28 and 29; and flanking said slotted portion 25 are the two longitudinally spaced pairs of transverse ridges 30, 30 and 31, 31. At the bottom of said wall are the oppositely positioned abutments 32 and 33, the former extending on the side opposite said hook portion 23 and being relatively short, and the latter being of substantially greater proportions than abutment 32 and extending horizontally and being disposed underneath said hook portion 23. In the preferred arrangement illustrated (see FIG. 2), the said rib 24 and the edge 33a of abutment 33 are in substantial vertical alignment when the hook member 16 is operatively mounted on the wall 12, whereby when said wall 22 of the hook member is in a substantially vertical position and said wall 33 is in abutting engagement with said wall 12, only the rib portion 24 of the hook member will rest upon the top of rim 13.

The thickness of the bracket 17 is slightly less than the width of the said slotted portion 25, so that both the stem 20 and cross-bar 21 of the T-shaped bracket can pass through the said slotted portion of the hook member 16 when the latter is being mounted upon said bracket or adjustably moved with respect thereto in the manner hereinbelow described.

To operatively mount said hook member 16 upon the bracket 17, the hook member is first held in a horizontal position with the slotted portion 25 in parallel alignment with the longitudinal extent of the cross-bar 21 of the bracket, as illustrated in FIG. 6. The said slotted portion of the hook member is then slipped over the bracket so that the cross-bar 21 has passed through said slotted portion and the stem 20 extends therethrough, whereafter the hook member is slidably moved along the bracket to a selected position such as that shown in FIG. 7. The hook member is then rotated about the said stem 20 in the direction of arrow A (FIG. 7), this rotary movement being continued until the wall 22 is in a vertical position.

When both hook members 16 are operatively mounted over the respective coacting brackets 17 in the above-described manner, the hook portions 23 of said members are placed upon the upper rim 13 of the supporting wall 12, as illustrated in FIGS. 1 and 2. The gravitational downward movement of the tank 10 will bring the cross-bars 21 of the brackets 17 into overlying engagement with the respective pairs of ridges 30, 30, as indicated in FIGS. 2 and 4. It will be noted that in this position no part of the supported tank 10 is in engagement with the said supporting wall 12, the only contacts with said wall being made by the abutment 33 and the rib 24. Since said abutment wall 33 extends rearwardly to about the midpoint of the hook portion 23—to the region of the said rib 24—the supported tank 10 is maintained at a suffcient distance from the supporting wall 12 to obviate the danger of any contact therewith during the operative manipulation of the tank. It will further be noted that each hook member 16 is in engagement with thickened reinforced portions of the wall 19 of the supported tank 10, to wit, the bracket 17 and the rib 18, thereby reducing to a minimum any danger of damage to the tank by the hook member.

With the pairs of ridges 30, 30 in supporting engagement with the bracket 17, the tank 10 is at the level indicated in FIG. 2. Should it be desired to lower the position of the tank, the hook members 16 are rotatably manipulated in the manner above described to bring the brackets 17 into overlying engagement with the respective pairs of ridges 31, 31, or with the respective bottom terminal walls 29 of the respective slotted portions 25. And should it be desired to disassemble the hook members 16 from the tank, all that need be done is to rotate each of said members to the position shown in FIG. 6, and then slip the members off the respective brackets.

In the above description, the invention has been disclosed merely by way of example and in preferred manner; but obviously many variations and modifications may be made therein. It is to be understood, therefore, that the invention is not limited to any form or manner of practicing same.

I claim:

1. In a hanger device for supporting an article on a wall member, a hook member having an upper hook portion and a wall portion joined thereto, said upper hook portion being proportioned for suspension engagement with said wall member, and a coactive bracket connected to said article for operative mounting on said hook member, said wall portion having a vertically disposed slotted portion and a plurality of spaced pairs of ridges disposed on opposite sides of and extending in directions substantially normal to the longitudinal extent of said slotted portion, said bracket comprising a stem and cross-bar of substantially T-shaped configuration and being in a substantially horizontal plane, the thickness of said stem being less than the width of said slotted portion, the stem of said bracket extending through said slotted portion and the cross-bar disposed exteriorly thereof, each of said pairs of ridges being positioned and proportioned for selective underlying supporting engagement with said cross-bar, whereby said hook member may be rotated about and slidably moved along said stem for adjustably positioning a selected pair of said ridges in underlying supporting engagement with said bracket, said hook portion being of inverted-U-shaped configuration and extending from said wall portion in a direction away from the said article when in an operatively supported position, and an abutment at the lower portion of said hook member and extending therefrom in the same direction as said hook portion, said hook portion having at the top medial portion thereof a transverse reinforcing rib, the terminal edge of said abutment and said rib being in substantially vertical alignment when said bracket is in a position operatively supported by a pair of said ridges.

2. In a hanger device, the combination according to claim 1, and a second abutment on said wall portion extending in a direction toward said article when the latter is in an operatively supported position, said second abutment being proportioned for abutting engagement with said supported article.

3. In a hanger device, the combination according to claim 2, and a vertical rib on said article extending downwardly from said bracket and being positioned for operative engagement with said second engagement.

4. In a combination with a hanger device according to claim 3, a fish breeder tank constituting said article, an aquarium housing said tank, said aquarium containing said wall member, said hook portion being operatively suspended from the upper edge of said wall member, said tank having a wall in spaced relation to said wall member of the aquarium and carrying said bracket, said wall portion of said hook member being disposed between said tank wall and said wall member of the aquarium.

5. A hanger device for adjustably supporting a fish breeder tank within an aquarium, said device comprising a hook member for suspension from a wall of the aquarium and a coactive bracket carried by a wall of said tank, said hook member having a wall portion joined to an upper hook portion of substantially inverted U-shaped configuration, said wall portion having therein a longitudinal slot flanked by a plurality of spaced pairs of ridges, said bracket comprising a stem and a cross-bar and being of substantially T-shaped configuration and disposed in a horizontal plane, the width of said slot being proportioned to operatively receive therethrough said bracket, the cross-bar of said bracket being proportioned and positioned for overlying engagement with a selected pair of said ridges, the thickness of said stem being less than the width of said slot whereby said hook member may be rotated about and slidably moved along said stem for adjustably positioning said hook member with respect to said bracket, whereby said tank can be adjustably positioned within said aquarium at a selected level.

References Cited

UNITED STATES PATENTS

| 2,478,256 | 8/1949 | Eysmann | 248—496 |
| 2,508,947 | 5/1950 | Hoke | 248—311 X |
| 2,838,099 | 6/1958 | Warner | 248—244 |
| 3,140,691 | 7/1964 | Stark | 119—5 |
| 3,216,395 | 11/1965 | Girard | 119—5 |
| 3,291,098 | 12/1966 | Halpert | 119—5 |
| 3,321,082 | 5/1967 | Willinger | 210—169 |

ROY D. FRAZIER, Primary Examiner

J. FRANKLIN FOSS, Assistant Examiner

U.S. Cl. X.R.

119—5; 210—169; 248—311, 327, 340